(12) United States Patent
Jähn et al.

(10) Patent No.: US 7,390,121 B2
(45) Date of Patent: Jun. 24, 2008

(54) STATIC MIXER MODULE

(75) Inventors: Peter Jähn, Leverkusen (DE); Helmut Brod, Köln (DE); Klemens Kohlgrüber, Kürten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/275,534

(22) Filed: Mar. 24, 1999

(65) Prior Publication Data

US 2001/0053108 A1 Dec. 20, 2001

(30) Foreign Application Priority Data

Mar. 27, 1998 (DE) ............... 198 13 600

(51) Int. Cl.
*B01F 5/06* (2006.01)
(52) U.S. Cl. ................................ 366/337; 366/340
(58) Field of Classification Search ............. 366/181.5, 366/337, 340; 138/37, 40, 42; 48/189.4; 261/113
See application file for complete search history.

(56) References Cited

U.S. PATENT DOCUMENTS

| | | | |
|---|---|---|---|
| 616,191 A * | 12/1898 | Jeffers | |
| 951,290 A * | 3/1910 | Selg | |
| 1,442,414 A * | 1/1923 | Rose | |
| 2,321,719 A * | 6/1943 | West | |
| 2,767,967 A * | 10/1956 | Hutchinson | |
| 2,998,234 A * | 8/1961 | Haselden | |
| 3,070,360 A * | 12/1962 | Raffertty | |
| 3,222,040 A * | 12/1965 | Eckert | |
| 3,572,391 A * | 3/1971 | Hirsch | |
| 3,582,048 A * | 6/1971 | Sarem | |
| 3,677,300 A * | 7/1972 | King | |
| 3,785,620 A * | 1/1974 | Huber | |
| 4,201,482 A | 5/1980 | Imhauser et al. | ............ 366/98 |
| 4,295,458 A * | 10/1981 | Pellerin | |
| 4,408,892 A | 10/1983 | Combes et al. | ............ 366/337 |

(Continued)

FOREIGN PATENT DOCUMENTS

DE  2328795  1/1975

(Continued)

OTHER PUBLICATIONS

Pahl, "Statische Mischer und ihre Anwendung", Chem.-Ing.-Tech. 52 (1980) pp. 285-291.

(Continued)

*Primary Examiner*—Charles E. Cooley
*Assistant Examiner*—David Sorkin
(74) *Attorney, Agent, or Firm*—Norris McLaughlin & Marcus PA

(57) ABSTRACT

Static mixer module, consisting of a disc which is provided with a multiplicity of orifices (6) and is structured on its front side and on its rear side by means of channels (4, 5), and in which the orifices (6) are made in the flanks (8) of the inlet channels (4) and open into the flanks (9) of the mixing channels (5). Furthermore, a mixer arrangement is described, which consists of at least two static mixer elements arranged one behind the other, at least one mixer element being a disc-shaped static mixer module. The mixer module and the mixer arrangement are used in pipelines and housings through which a flow passes.

15 Claims, 7 Drawing Sheets

U.S. PATENT DOCUMENTS

| | | | |
|---|---|---|---|
| 4,497,753 A | 2/1985 | Streiff | 261/95 |
| 4,708,852 A | 11/1987 | Helbling, Jr. et al. | 422/220 |
| 4,848,920 A | 7/1989 | Heathe et al. | 366/339 |
| 4,902,418 A * | 2/1990 | Ziegler | |
| 5,137,369 A * | 8/1992 | Hodan | |
| 5,171,544 A | 12/1992 | Lang | 422/224 |
| 5,554,329 A * | 9/1996 | Monkelbaan | |
| 5,605,399 A * | 2/1997 | King | |
| 5,616,289 A | 4/1997 | Maeda | 261/112.2 |
| 5,922,970 A * | 7/1999 | Ohle | |
| 6,394,644 B1 | 5/2002 | Streiff | 366/337 |

FOREIGN PATENT DOCUMENTS

| | | |
|---|---|---|
| DE | 2822096 | 11/1979 |
| EP | 0 070 915 A1 | 2/1983 |
| EP | 0195450 | 9/1986 |
| EP | 0 226 788 A1 | 7/1987 |
| EP | 0 489 211 A1 | 12/1990 |
| EP | 0 530 510 A1 | 3/1993 |
| GB | 1473588 | 5/1977 |

OTHER PUBLICATIONS

Pahl, "Einsatz und Auslegung statischer Mischer", Chem.-Ing.-Tech. 51 (1979) pp. 347-363.

* cited by examiner

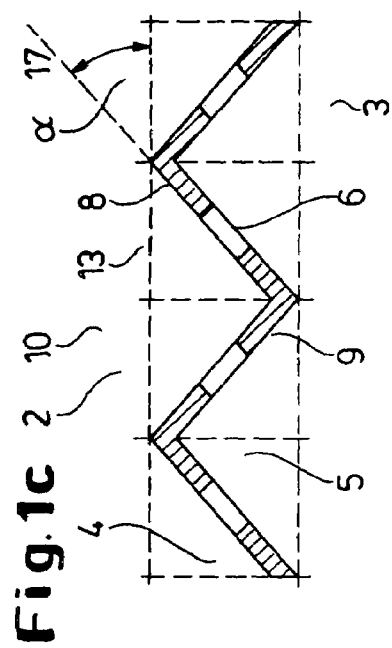
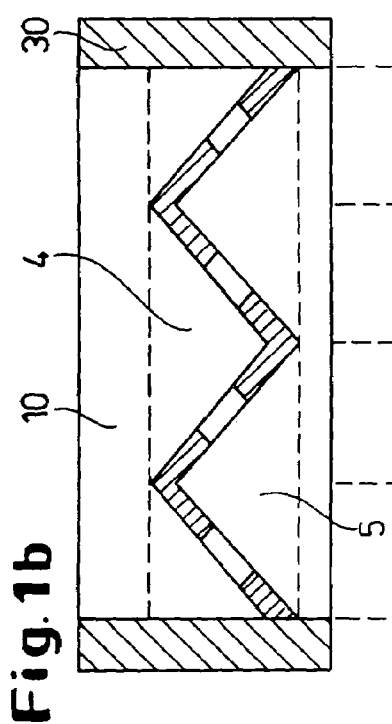
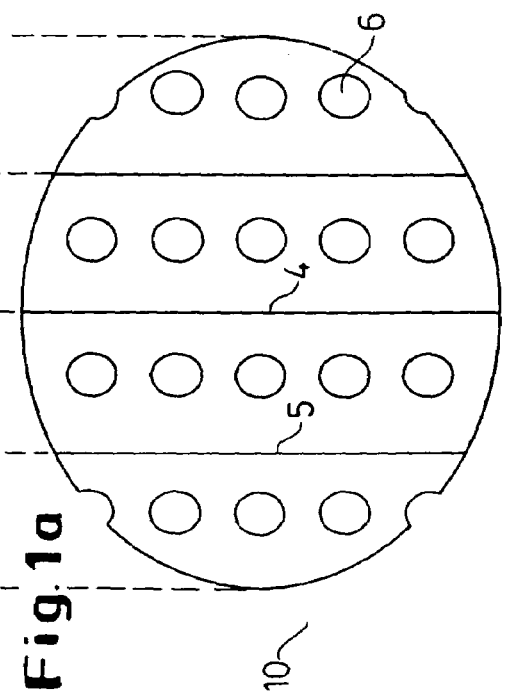

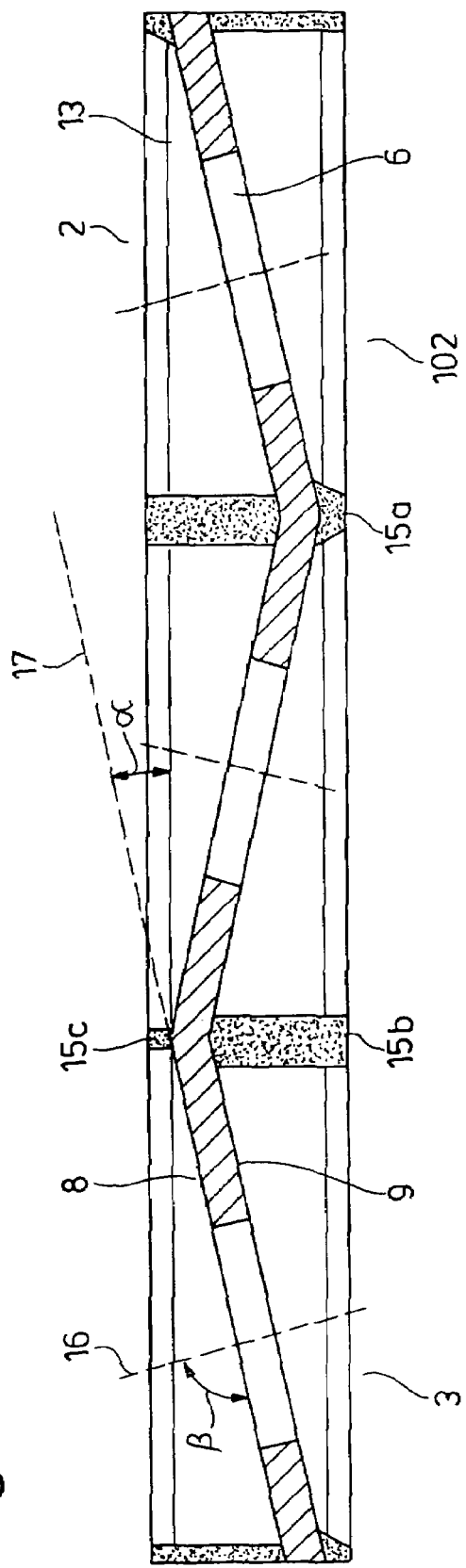

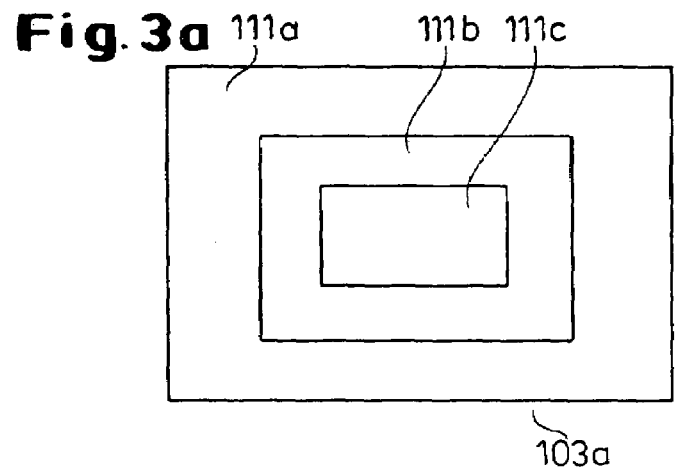
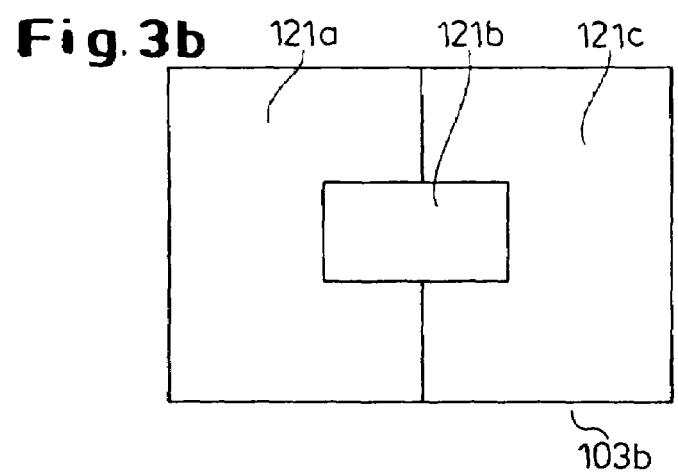
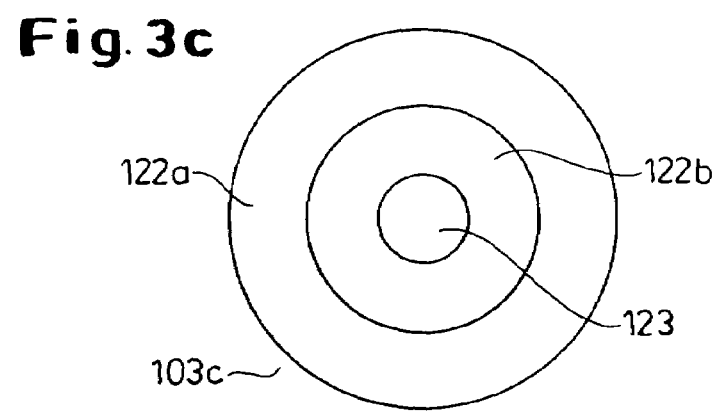

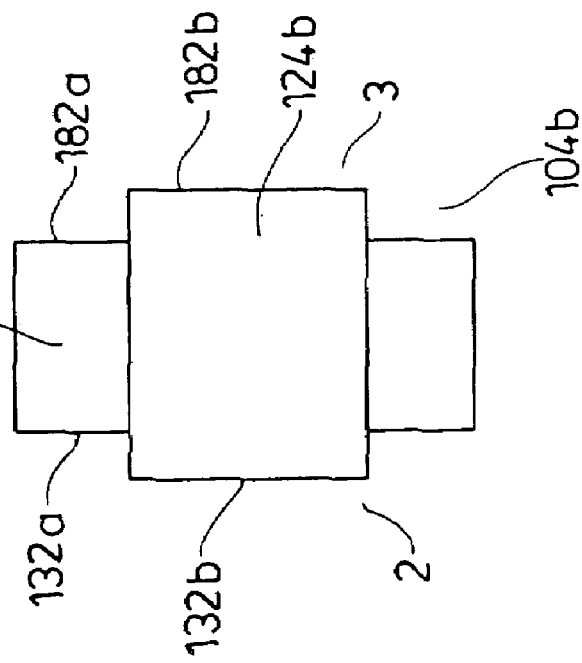
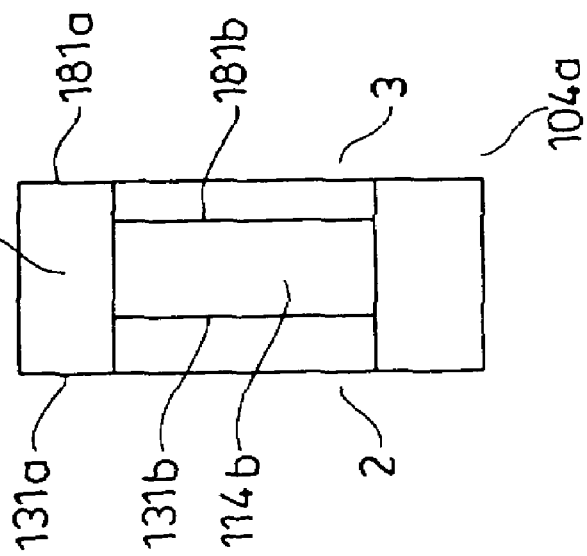

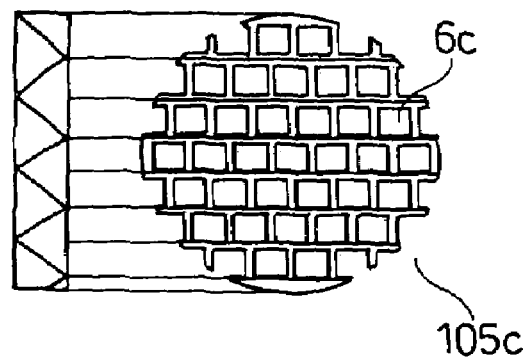
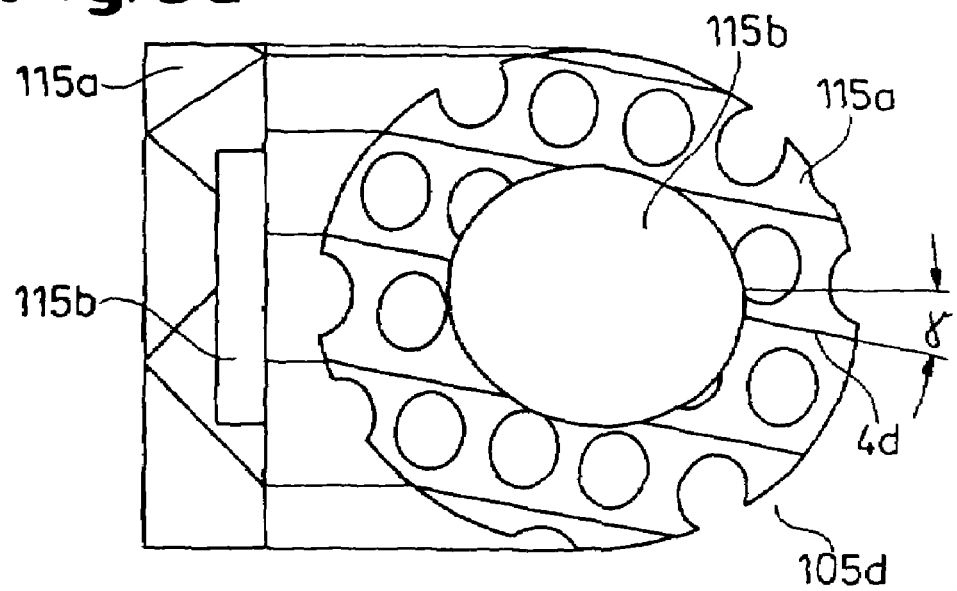

STATIC MIXER MODULE

The invention relates to a disc-shaped static mixer module with a multiplicity of orifices, which is structured on the front and rear sides by means of channels, the orifices terminating in the flanks of the channels on the front and rear sides. The invention relates, furthermore, to a mixer which contains at least two static mixer modules arranged one behind the other, at least one being an above-described disc-shaped static mixer module. The mixer module and the mixer are used in pipelines and housings through which a flow passes.

The front side of the mixer module or the mixer is the side directly opposite to the flow.

Current static mixers are described by M. H. Pahl and E. Muschelknautz in "Einsatz und Auslegung statischer Mischer" ["Use and Design of Static Mixers"], Chem.-In.-Tech. 51, No. 5, p. 347-364 (1979), and by Pahl and Muschelknautz in Statische Mischer und ihre Anwendung [Static Mixers and Their Use], Chem.-Ing.-Tech. 52, No. 4, p. 285-291 (1980).

A distinction is made between helical mixers and other mixers. The oldest helical mixer, which is often used, is the Kenics mixer. With helical mixers, the product stream is divided into two to four part streams. These part streams are led through helices in the pipe. The edges of successive individual helices are rotated relative to one another, so that a new division of the product stream occurs at every further helix. Mixing with the aid of helical mixers is highly ineffective, since very long mixing stages are required.

A static mixer with intersecting webs and plates is described in DT 23 28 795. This static mixer consists of a plurality of intersecting discs which engage one in the other in a comb-like manner with webs and slots and which are mounted so as to be inclined relative to the axis of the housing, for example a pipe or channel through which the mix (product) flows. The discs divide the product stream into a number of part streams which corresponds to the number of webs. In order to achieve a good mixing result, a plurality of such static mixers are arranged one behind the other and, at the same time, successive static mixers are rotated relative to one another at a fixed angle.

The known intersecting-web mixers have the following disadvantages with regard to their mixing action: during flow through the intersecting-web mixer, part streams form along the webs in the product stream, as seen in the direction of flow. These part streams may flow over a distance, which is greater than the diameter of the housing surrounding the mixer, virtually unimpeded and without being intermixed with other part streams. These part streams flowing, unimpeded, over long distances are called "preferred flow channels".

The "preferred flow channels" prevent an additional component from being mixed quickly and effectively into a product stream, particularly where high-viscosity liquids are concerned. Only by means of a predetermined exact angular offset of successive static mixers are the "preferred flow channels" blocked at the transition to the next static mixer and additional components mixed in more effectively.

The requirements of a static mixer which is to be used on an industrial scale go beyond achieving a good mixing result over a short mixing distance: in addition, a low production outlay, simple mounting and simple demounting in the event of repair, low susceptibility to faults and careful treatment of the mix as a result of a short dwell time in the mixer are required in order to obtain a good product quality.

Due to the insufficient mixing action of the individual static mixers, it is necessary to use a multiplicity of individual mixer elements. The mixing distance thereby becomes comparatively long. So that the webs of the individual plates of this mixer, which engage one in the other in a comb-like manner, are fixed accurately and immovably relative to one another, these webs have to be connected by welding at the intersection points. In the case of large diameters, the number of locations to be welded increases to such an extent that reasons of economy militate against the use of such mixers. This may lead to irreparable deformations of the webs if pressure gradients are high. During operation, a mixer element which is deformed for these or other reasons constitutes a flow resistance which may be so high that blockage of the mixing pipe and further destruction of the mixer element occur. If the comb-like plates are deformed, the mixer elements have to be removed, cleaned, repaired and installed again. Complicated removal from the mixing pipe often leads to further deformations on the elements, so that they have to be replaced completely.

Under some circumstances, the long mixing distance results in a high pressure loss and a long dwell time of the flowing liquid in the static mixer. A long dwell time may have an adverse effect on the quality of the products. Encrustations and damage to the product inside the mixer may occur.

If the engineering design is changed, for example the housing diameter or pipe diameter enlarged, because of an increase in the product volume flow, the mixer elements also have to be redesigned. A simple proportional enlargement of the mixer, with a constant number of divisions of the main stream, leads to a necessary enlargement of the individual flow channels and, consequently, to a poorer mixing result, particularly when the product stream to be mixed in is very much smaller than the main stream. That is to say, in this case, the mixer length must increase superproportionally, in order to achieve a constant mixing result. If the proportions are changed, the mixing distance has to be redesigned at a high outlay in terms of its mixing action and stability.

DE 28 22 096 discloses drilled bar mixers which consist of a cylindrical block, the length of which is greater than its diameter. A multiplicity of continuous parallel channels are drilled into this block and intersect one another at an angle to the main flow direction. The drilled bar mixer withstands a high pressure gradient. One disadvantage is that the drilled bar mixer is very complicated to manufacture and the design of the mixer is invariable. Thus, for example, the diameter of the channels cannot be arbitrarily reduced, since, when the channels are being made, drills with too small a diameter cannot maintain the predetermined direction, but run out of true during drilling. The drilled mixers therefore cannot be freely adapted to process engineering requirements. Bar mixers can be manufactured only within narrow dimensional limits.

As in the known static mixers, in the drilled bar mixer, too, "preferred flow channels", which prevent a good mixing action, are formed. A plurality of drilled bar mixers positioned one behind the other have to be arranged, so as to be rotated relative to one another at a specific angle, in order to achieve an acceptable mixing action, thus making mounting more difficult.

The Komax mixer, known from EP 0 195 450, attempts to achieve simpler mounting and a higher mixing action, particularly in the case of high-viscosity substances. The Komax mixer consists of a plurality of cylindrical discs with a plurality of bores of the same size which are parallel to the cylinder axis. The discs are arranged one behind the other so as to be offset in such a way that the bores in each case partially overlap one another in the direction of flow. As a result, in the mounted state, cavities are formed. Radial intermixing is consequently improved, as compared with the drilled bar mixer and the mixers from DT 2 328 795, since "preferred flow channels" cannot be formed. However, the dwell time is also increased on account of the cavities through which the flow does not pass effectively.

The object of the invention is to reduce appreciably or to eliminate the disadvantages of the known static mixers. This includes, in particular, achieving a comparable or better mixing result over a shorter mixing distance, lowering the dwell time of the mix, increasing stability against high pressure gradients, improving mounting convenience and reducing the production outlay.

This object is achieved by means of a disc-shaped one piece static mixer module with a multiplicity of orifices, which is structured on its front and rear sides by means of channels, the channels being defined by channel walls and the orifices passing through the channel walls. The channels on the front side of the module are designated below as inlet channels and the channels on the rear side as mixing channels. Preferably, a plurality of mixer modules are arranged one behind the other in order to improve the mixing action. The orifice cross sections may have any desired geometry. They may, for example, be square or circular. The orifices are preferably arranged so as to be distributed in one or more rows on the channel walls.

In the static mixer module according to the invention, the ratio of the axial length, the length of the mixer in the direction of flow, to the diameter is preferably lower than 1, preferably lower than 0.75, particularly preferably lower than 0.25.

The distance between the planes which lie across and touch the highest elevations, in the direction of the center axis of the disc shaped module, of front side and the rear side of the disc shaped module, and which are perpendicular to the center axis of the disc shaped module is designated, here, as the axial length of the module, The foregoing planes are hereinafter referred to as disc planes.

The channels on the front and rear sides may have any desired form independently of one another. In a preferred form of the mixer module, the channels have a V-shaped, U-shaped, rectangular or trapezoidal cross-sectional profile.

In a preferred form, particularly in a version with a V-shaped, U-shaped, rectangular or trapezoidal profile of the channels, the latter have on the front and rear sides, independently of one another, straight flanks which are at an angle $\alpha$ of 5 degrees to 85 degrees to the disc plane of the front side or to the disc plane of the rear side of the mixer module.

By disc plane is meant, in this context, the geometric plane which forms the outer boundary of the front side, the said outer boundary facing the onflowing mix, or the outer boundary of the rear side, the said outer boundary facing away from the said mix.

In a variant of the static mixer module, particularly in a version with a V-shaped, U-shaped, rectangular or trapezoidal profile of the channels, the flanks of the channels are straight on the front side and/or rear side of the module and are at an angle $\alpha$ smaller than 15 degrees to the disc plane of the front side and/or of its rear side, the mixer module having additional spacer contours, in particular bosses, teeth or warts on its front side and/or its rear side. In the case of an inclination of up to 15 degrees, therefore, additional spacer contours, for example bosses, teeth or warts, are attached to the front side or the rear side of the mixer, so that, even in this case, there are still sufficiently large cavities available for mixing the mix stream between, for example, two successive identical mixer modules.

The orifices in the channel walls of the mixer module are usually made in such a way that they are defined by parallel walls which are approximately perpendicular to the channel walls through which they pass. The parallel walls of the orifices may, however, also form an angle $\beta$ of $\pm 30$ degrees to the channel walls.

Depending on the flow profile of the mix which flows onto the mixer module, it may be advantageous, as seen over the flow cross section, to achieve a different mixing action or mixing intensity in the edge region or in the inner region of the flow cross section. For this purpose, the mixer module is preferably divided into two or more regions or segments which may have differently arranged and/or differently structured channels on the front side and/or rear side of the mixer module.

Different structuring means that the structures of the regions or segments differ in the nature of the profile of the channels, in the flank angle $\alpha$, in the run of the channels (straight, parallel, concentric) and/or in the arrangement, the spacings and the cross-sectional areas of the orifices in the flanks. Segments are to be understood, here, as separately manufactured portions of the module.

In a preferred embodiment, for example for installation in round pipelines, the boundaries of the regions or segments are arranged concentrically about the centre point of the mixer module.

One variant of the static mixer module which is divided into regions or segments is designed in such a way that its extent, as seen in the direction of flow of the mix, is of different length in the various regions or the segments. This means that the spacing between the planes of the front side and the planes of the rear side of the mixer is different in the various regions or segments.

Preferably, the mixer module has, on its front side, baffle surfaces in the disc plane, in particular flattenings or sheet-like elevations which are located between the channels and the surface of which is perpendicular to the direction of flow of the mix.

The static mixer module may be manufactured from any desired materials, such as metal, plastic, ceramic or glass. Preferred materials are alloyed steel, non-ferrous metal, thermoplastic, glass, ceramic or catalytically active materials. The mixer module may also be coated with a catalytically acting material.

Particularly where the mixing of high-viscosity fluids is concerned, it has proved particularly advantageous to arrange more than one static mixer module in the flow path of the mix, in order to achieve a good mixing result. The mixer arrangement then consists of at least two static mixer modules according to the invention, arranged one behind the other, or of the combination of at least one static mixer module according to the invention and one conventional static mixer.

Another subject of the invention is, therefore, also a mixer arrangement consisting of at least two static mixer elements arranged one behind the other, at least one mixer element being a disc-shaped static mixer module according to the invention.

In a preferred mixer arrangement, at least two disc-shaped static mixer modules according to the invention are arranged directly one behind the other.

It has proved particularly advantageous, in terms of the mixing action, to select a mixer arrangement in which the disc-shaped static mixer modules arranged one behind the other are positioned in such a way that the mixing channels of the first mixer module are arranged so as to be offset or rotated relative to the inlet channels of the following mixer module.

A preferred mixer arrangement is characterized in that the adjacent disc-shaped static mixer modules have parallel sets of straight channels on their front side and/or rear side and the mutually facing channels of the adjacent mixer modules are rotated relative to one another at an angle γ of 5 degrees to 175 degrees. Rotation prevents the formation of preferred flow channels which, in the case of a high-viscosity mix, are an obstacle to an equal distribution of the mix over the flow cross section.

Special properties are obtained from mixer arrangements which have at least one mixer module according to the invention divided into regions or segments. This mixer arrangement is designed in such a way that the static mixer module with regions or segments is followed directly by a static mixer element which is a conventional static mixer or a disc-shaped static mixer module according to the invention, the outer or inner contour of which is adapted to the boundaries of the regions or segments and which engages into the regions or segments of the disc-shaped static mixer module which have a smaller spacing between the disc plane of the front side and the disc plane of the rear side than the remaining regions or segments.

The static mixer and the disc-shaped static mixer module divided into regions or segments, in this case, succeed one another in any desired way.

A particularly preferred version of the abovementioned mixer is designed in such a way that the engaging static mixer terminates flush with the end or with the start of the divided mixer module. That is to say, the unit consisting of the disc-shaped static mixer module and of the engaging static mixer is designed in such a way that the engaging static mixer terminates flush with the disc plane of the front side or the disc plane of the rear side of the segments or regions, the said disc plane having a maximum spacing from the planes of the front side or the rear side respectively.

Another subject of the invention is a mixer, consisting at least of two static mixer modules according to the invention or of at least one mixer arrangement according to the invention, in which the mixer module or the mixer arrangement is installed in a pipe, through which mix flows, in such a way that the front side of a mixer module or of the mixer module from the mixer arrangement points in the opposite direction to the direction of flow of the mix.

The mixer modules according to the invention or the mixer arrangements composed of them make it possible to have a small and compact design of a static mixer which can be incorporated into production plants more easily than the mixers of the prior art. On account of the shorter mixing distance, the product dwell time in the mixing distance is also lower, this having a positive effect on the product quality.

Shorter mixing distances may lead to lower pressure losses. The susceptibility to faults of the mixer modules or of the mixers according to the invention, in particular their pressure sensitivity, is markedly reduced, since there is no need for any connecting welds or the like in order to construct the mixer modules. Individual mixer modules may be manufactured from one part, for example by the casting or forming technique. For simpler mounting, the modules may be assembled in desired mounting units with mounting rods of corresponding length or with mounting wires which are fed through additional bores. It is possible to simplify the mounting operation, for example, by welding mixer modules or simply by lining them up by means of a fine axial bore on a mounting wire and fixing the wire.

Damage to individual modules when the mixers are demounted is avoided in that the said modules are more resistant to breakage than a press ram which acts in order to expel the mixers from a pipeline. The mounting and also remounting of the mixer are very simple, since exact positioning and rotation of the modules in relation to one another are not necessary in order to achieve a specific mixing result.

Arbitrary rotation of a plurality of static mixer modules in a mixer prevents preferred flow channels and leads to a good mixing result. A particular advantage of the static mixer modules according to the invention is that they can be enlarged without difficulty in the case of an increasing hydraulic diameter of the flow channel. The structuring of the front and rear sides of the modules is preserved, the same structuring simply being continued over a larger area. The number of orifices per unit area and, consequently, the local mixing conditions remain the same at any point on the cross section of the inflow channel.

The static mixer arrangements according to the invention can be adapted flexibly, quickly and inexpensively to a wide variety of mixing tasks. On the one hand, predetermined mixers may be combined with one another in any desired way. On the other hand, the individual modules may be structured according to the requirements without any appreciable outlay, so that different pressure gradients and velocities of the flowing mix can be generated on different modules. The number of part streams produced may be set, as desired, within wide limits. These parameters can be adapted to the conditions in the mix with regard to viscosity, the volume ratios of the product streams to be mixed and their flow diameters, in order to afford an optimum mixing result.

The mixer modules or mixer arrangements according to the invention may be used for the liquid/liquid mixing of dyes or additives in polymer melts for the intermixing of components of the same or different viscosity. They may also be used for intermixing liquid and gaseous substance streams, and, for example, the gaseous component may be an entrainer for the removal of undesirable volatile secondary components. When modules or mixer arrangements having catalytically acting surfaces are used, large reaction areas for heterogeneous catalysis can be provided. In the case of heated pipelines, the transmission of heat from the modules or mixer arrangements located in the pipeline to the mix, particularly where high-viscosity substances are concerned, can be improved if the static mixer has attached to it an outer closed ring which allows simple adaptation by means of a small defined gap leading to the pipe interior.

The mixer modules or mixer arrangements according to the invention are likewise suitable for the comminution of solid agglomerates in a liquid phase. The static mixers according to the invention may be used as packing in separation columns and assist the thermal mass-transfer process. The static mixer modules may also be produced by the microstructure technique and be employed for uses in the field of microstructure technology.

The invention is explained in more detail below by way of example with reference to the Figures of which:

FIGS. 1a-c show a top view and cross sections of a static mixer module.

FIG. 2 shows a cross section of a static mixer module with flat flanks and spacer bosses, warts and teeth.

FIGS. 3a-c show a top view of static mixer modules having different outer contours which are divided into a plurality of regions or segments with different structuring.

FIGS. 4a, b show mixers with different thicknesses in different regions/segments.

FIGS. 5a-d show mixers consisting of four mixer modules.

Figure 5A:
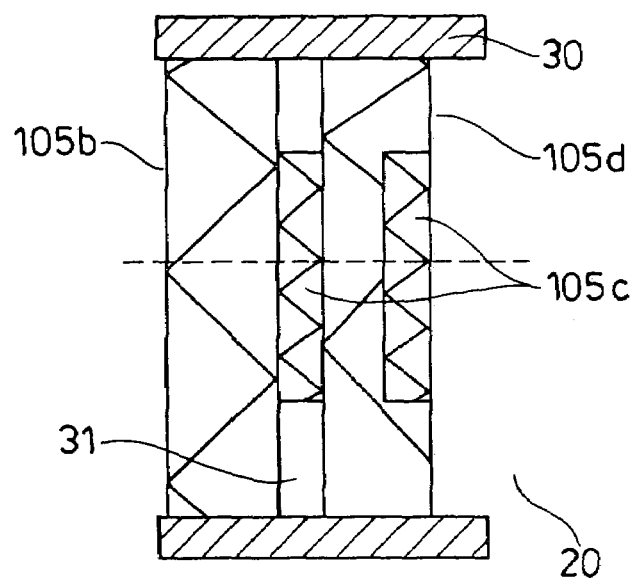

FIG. 1a shows a top view of a static mixer module 10 to be installed in a pipe 30 having a circular cross-sectional surface. The channels 4, 5 run parallel. The round orifices 6 are arranged at regular intervals. FIG. 1b shows, in cross section, the mixer module 10 as it is when installed in a pipe 30. The cross section of the static mixer module in FIG. 1c shows a V-shaped profile of the channels 4, 5. The orifices 6 are located in the flanks 8 of the inlet channels 4 on the front side 2 and in the flanks 9 of the mixing channels 5 on the rear side 3 of the mixer module 10. α designates the angle between the disc plane 13 and the flank plane 17.

As seen in FIGS. 1a-1c, v-shaped panels each define two planar surfaces corresponding to the legs of a v. Each planar leg surface has a central single row of orifices 6. For each v-shape panel, orifices 6 of one leg are aligned to be in the same cross section as orifices 6 of the other leg, the cross-sections being taken perpendicular to the line of intersection of the two planes. FIGS. 1a and 1c are examples of such cross-sections. This arrangement of orifices is such that extensions of paths of the orifices 6 of the opposed planes of each v-shaped panel intersect.

FIG. 2 shows a cross section of a static mixer module, in which the flanks 8 of the inlet channels on the front side 2 and the flanks 9 of the mixing channels 5 on the rear side 3 are straight and parallel to one another. The flank plane 17 is at an angle α smaller than 15 degrees to the disc plane 13. The mixer module additionally has bosses 15a, teeth 15b and warts 15c as spacer contours on the front side 2 and the rear side 3. The mid-axis 16 of the orifices 6 is at the angle β=90° to the flank plane 17.

FIGS. 3a-c show a top view of various static mixer modules 103a-c in diagrammatic illustration. The mixer module 103a in FIG. 3a has a rectangular base area. It is divided into three regions 111a, 111b, 111c which are located one in the other and which are in each case differently structured. The mixer module 103b in FIG. 3b likewise has a rectangular base area and is composed of the two segments 121a, 121c and a middle segment 121b. All three segments 121a-c are differently structured. The mixer module 103c in FIG. 3c has a circular base area. It is composed of two concentric mixer module segments 122a, 122b located one in the other and having different structuring and of a static mixer 123 of conventional type in the middle.

FIG. 4a shows, in simplified form, a static mixer module 104a which is divided into two regions 114a, 114b concentric about its centre point and in which the spacing between the plane 131a of the front side 2 and the plane 181a of the rear side 3 of the mixer module is greater than the spacing between the plane 131b of the front side and the plane 181b of the rear side 3.

FIG. 4b shows a static mixer module 104b which is divided into two segments 124a, 124b concentric about its centre point and in which the spacing between the plane 132a of the front side 2 and the plane 182a of the rear side 3 of the mixer module is smaller than the spacing between the plane 132b of the front side 2 and the plane 182b of the rear side 3.

Figure 5B:
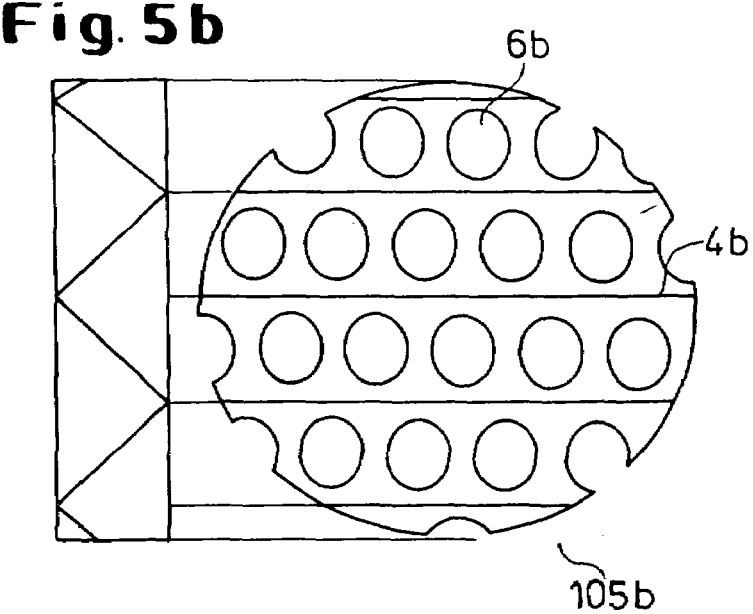

FIG. 5a shows a side view of a mixer arrangement 20 which is installed in a pipe 30 and which consists of four mixer modules 105b, 105c, 105d, 105c. FIGS. 5b-d show the three different mixer modules, which are used in the mixer arrangement 20 in a top view and in cross section, the channels of the cross-sectional profile being assigned by means of thin subsidiary lines to the corresponding channels in the top view. The static mixer module 105b is illustrated in FIG. 5b. It has an outside diameter corresponding to the diameter of the pipe 30 and round orifices 6b. FIG. 5c shows the geometry of the mixer module 105c which is used twice in the mixer arrangement 20. It has a smaller outside diameter than the pipe diameter and is structured differently from the mixer modules 105b and 105d. The orifices 6c are rectangular. A cavity 31 is formed around the mixer module 105c which is installed in the mixer arrangement 20 between the mixer modules 105b and 105d. The mixer module 105d is illustrated in FIG. 5d. It is structured in exactly the same way as the mixer module 105b and has the same outside diameter. In contrast to 105b, it is less thick in an inner region 115b than in the outer region 115a. When the mixer arrangement 20 from FIG. 5a is assembled, one of the two mixer modules 105c engages into this recess 115b. Furthermore, the mixer module 105d is installed in the mixer arrangement 20 in such a way that the channels 4d are rotated through the angle γ relative to the channels 4b of the mixer module 105b.

Figure 6A:
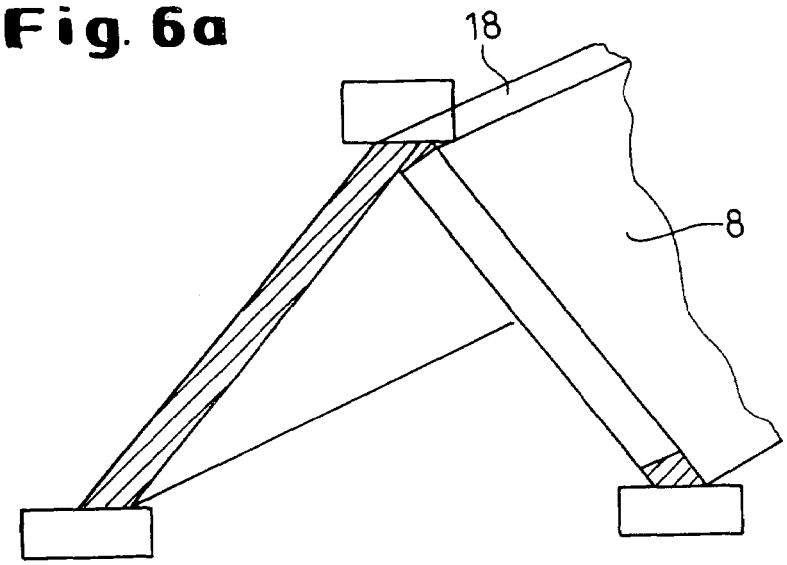
FIG. 6a shows a detail of a mixer module with straight channels and flattened front edges.

FIG. 6a reproduces a detail of a mixer module, in which the edges located between adjacent inlet channels are flattened on the front side 2. The axial length of the module is thereby reduced. The flattening forms a baffle surface 18 for the mix flowing out on the front side of the module.

Figure 6B:
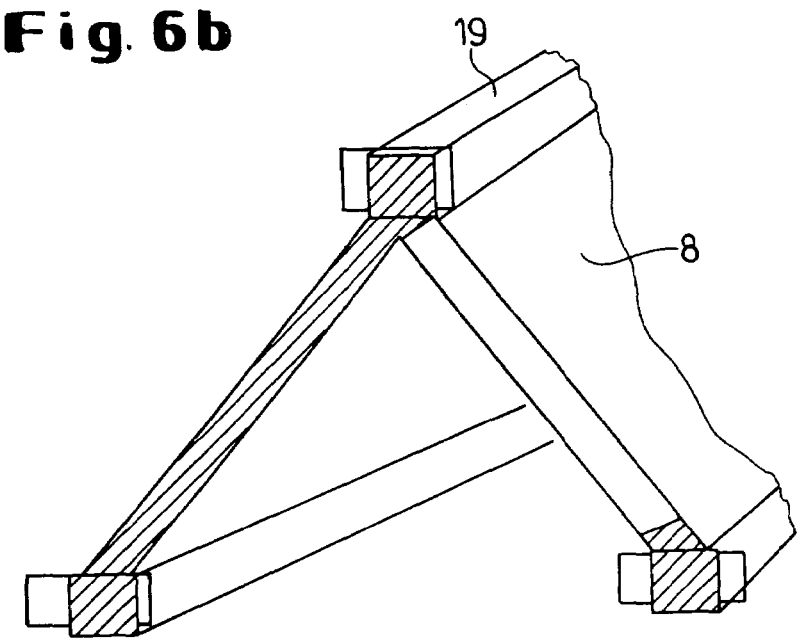
FIG. 6b shows a design comparable to that of FIG. 6a, with ribs on the front and rear sides.

In FIG. 6b, the mixer module is elevated on the front and rear sides by means of additional ribs 19, the front side of the ribs 19 forming a baffle surface for the onflowing mix.

EXAMPLE

Comparative tests were conducted in order to evaluate the mixing quality of static mixer modules (SMM) according to the invention, as shown in FIG. 1a.

The outside diameter of the mixer modules used in the comparative test was 20 mm, the flank angle α 45 degrees, the diameter of the orifices 3 mm and the total number of orifices in each module 24.5. 86 of these mixer modules were arranged one behind the other, successive modules having their mixing channels in each case rotated through an angle γ of about 90 degrees. The length of the mixing distance consisting of the 86 mixer modules was about 300 mm.

For comparison, a helical mixer (WM), a Kenics mixer and an intersecting-web mixer (X-SM) were used for the same mixing task.

The mixing task was to mix two plastic melts (temperature>250° C.), having a viscosity of about 600 Pa.s in a pipe with a diameter of 20 mm. The melts were a brittle thermoplastic polymer (polycarbonate), to which an elastic polymer component (rubber mixture) had to be admixed, in order to increase the pliability of the thermoplastic. The better and the more homogeneously the elastic component is mixed into the brittle plastic, the greater the effect on the material property of the plastic mixture, in this case the pliability.

Ten test pieces were injection-moulded in each case by means of the plastic mixtures resulting from the mixing tests. The test pieces were subjected to an Izod impact resistance test in a test machine under standard conditions. During this, all the test pieces were destroyed when the mixer of the WM type was used, and in the other two cases only one of the ten was destroyed. That is to say, the mixer WM did not achieve the mixing target. The length of the mixer WM was 1000 mm, the length of the X-SM type 350 mm and the length of the static mixer module SMM 300 mm. The production outlay for the individual mixers is reflected in the relative costs for producing the mixer and is the greatest for the X-SM type. The reason for the difference is that the mixer X-SM has to be welded as an individual piece, whereas the modules of the mixer of the SMM type can be manufactured by the simple casting technique.

The table summarizes the results of the comparative test. The mixer lengths were standardized to the longest of the tested mixers (1000 mm=100%) and the costs were standardized to the most complicated and therefore most costly mixer at 100%.

| Mixer | Mixer length (%) | Mixing target | Costs (%) |
|---|---|---|---|
| WM | 100 | no | 30 |
| X-SM | 35 | yes | 100 |
| SMM | 30 | yes | 30 |

Example 2

Static mixer modules of various embodiments were investigated as to pressure loss and mixing quality in a model mixing distance. A polydimethylsiloxane (Silicone oil Baysilone M10.000 from Bayer AG), having a dynamic viscosity of 10 Pa.s at room temperature, served as a high-viscosity test liquid. A part quantity of the silicone oil was dyed with an inorganic black pigment. Undyed and dyed silicone oil was fed to the mixing distance as two separate part streams in a mixing ratio of 5 to 1. The total throughput was 9 kg/h. After passing through the mixing distance, the mix was led through a transparent slit nozzle with a flow cross section of 4 times 110 mm. The nozzle was illuminated from one side by a homogeneous light source. The mixing pattern was observed from the other side by means of a video camera. The video signal from the camera was digitized and, using a calibrating function, was employed to calculate the local concentration of pigment. This spatial concentration distribution was evaluated statistically in terms of the average value and standard deviation.

In many practical uses of static and dynamic mixers, the mixing quality is quantified by means of the so-called variation coefficient. The variation coefficient is defined as the ratio of the standard deviation and the average value of a concentration distribution. It is often assumed that mixtures may be considered as sufficiently homogeneous for practical purposes if the variation coefficient has a value lower than 5%.

Table 1 contains a list of different static mixer arrangements according to the invention which were investigated in the model mixing distance. The geometry of the individual static mixer modules corresponds fundamentally to the design shown in FIGS. 1a to 1c, and both this geometry and their arrangement and number in the assembled mixer are specifically described by a series of parameters which are specified in the table. The meaning of the individual geometric parameters may be gathered from FIG. 1c. Table 1 reproduces the result of the mixing tests in terms of the number of static mixer modules according to the invention, the pressure loss during the flow through the model mixing distance and the measured variation coefficient.

It also becomes clear, in this case, that, in an arrangement of the mixer modules with static rotations, as compared with an ordered assembly, the particular mixing task can be selected by means of just a few exact rotations through 90° (mid-axis). The modular design of the mixer allows the mixer to be adapted simply and quickly.

Differently structured mixer modules

| SM No. | D mm | Product orifice 6 mm | Spacing of the product orifices mm | Offset of the product orifice mm | Orifice rows per flank Qty. | Number of product orifices Qty. | Flank thickness mm | Module height mm | α Deg. | γ Deg. | Number of modules | Variation coefficient % | Pressure loss bar | Remarks |
|---|---|---|---|---|---|---|---|---|---|---|---|---|---|---|
| 1 | 20 | 5φ | 7 | 3.5 | 1 | 8 | 2 | 5.5 | 45 | 0 | 30 | 20 | 0.44 | 1*) |
| 2 | 20 | 5φ | 7 | 3.5 | 1 | 8 | 2 | 5.5 | 45 | Stat. | 30 | 13.2 | 0.53 | 2*) |
| 3 | 20 | 5φ | 7 | 3.5 | 1 | 20 | 2 | 5.5 | 45 | Stat. | 30 | 13.8 | 0.23 | 2*) |
| 4 | 20 | 3φ | 4.2 | 2 | 1 | 23 | 1.2 | 3.8 | 45 | 0 | 40 | 7.1 | 0.98 | 3*) |
| 5 | 20 | 2φ | 1.5 | 0.75 | 1 | 42 | 1.5 | 2.3 | 45 | Stat. | 40 | 7.1 | 2.23 | 2*) |
| 6 | 20 | 5 × 5 | 7 | 3.5 | 1 | 8 | 1.5 | 7.5 | 45 | 0 | 16 | 8.4 | 0.2 | 4*) |
| 7 | 20 | 5 × 5 | 7 | 3.5 | 1 | 8 | 1.5 | 7.5 | 45 | Stat. | 16 | 16.2 | 0.35 | 2*) |
| 8 | 20 | 3 × 3 | 4 | 2 | 1 | 23 | 1 | 4 | 45 | 0 | 24 | 12 | 0.32 | 3*) |
| 9 | 20 | 2 × 2 | 5 | 1.5 | 1 | 42 | 1 | 3.4 | 45 | 0 | 24 | 14 | 0.62 | 3*) |
| 10 | 20 | 4.8 × 2.4 | 4.8 | 2.4 | 1 | 12 | 1.5 | 5.8 | 45 | 0 | 20 | 9 | 0.36 | 5*) |
| 11 | 20 | 4.8 × 1.4 | 3 | 1.5 | 1 | 24 | 1.5 | 5.8 | 45 | 0 | 20 | 30.3 | 0.53 | 5*) |
| 12 | 20 | 2.3 × 1.3 | 2.8 | 1.4 | 1 | 36 | 1.5 | 4.1 | 45 | 0 | 20 | 13.4 | 1.1 | 3*) |

Explanatory notes to Table 1:

D: pipe inside diameter

Product orifice: product orifices 6 in the flanks 8 of the inlet channels 4.

Spacing of the product orifices 6: horizontal spacing between the adjacent product orifices 6 on a flank 8 (spacing of the orifice centre points).

Offset of the product orifices 6: centre offset of the product orifices of product orifice rows which are arranged on opposite flanks 8.

Orifice rows per flank: number of product orifice rows per flank.

Flank thickness: material thickness, axial length of the product orifice.

Module height: the axial length of the module in the direction of flow.

α: angle of inclination of the flank 8.

γ: angle of rotation of adjacent mixer modules about the axial centre point.

Number of modules: number of mixer modules arranged directly one behind the other in the mixing distance (mixer).

Remarks:

1*) In each case 10 mixer modules are assembled, here, to form a bundle, the angle of rotation between adjacent module bundles being γ=90°.

2*) Statistical arrangement of adjacent mixer modules with an angle of rotation γ of 5-175°.

3*) The mixer is divided into bundles with 5 mixer modules. Adjacent module bundles are rotated at γ=90° to one another about the centre point of the modules.

4*) The mixer is divided into 4 bundles with 4 mixer modules. Adjacent module bundles are rotated at γ=90° to one another.

5*) The mixer is divided into 5 bundles with 4 mixer modules. Adjacent module bundles are rotated at γ=90° to one another.

As compared with comparable Examples Nos. 6 and 7, the mixer modules according to Examples SM Nos. 1 and 2 also have a further particular feature in addition to the different geometry of the orifices 6 (round orifices instead of square orifices).

In modules corresponding to Nos. 1 and 2, the upper and lower edges are flattened (see FIG. 6a), thus resulting in a smaller module height. The baffle surfaces, which in this case are located opposite the product stream on the front side, surprisingly improve the variation coefficient, as compared with structurally identical modules without any flattening of the edges (as shown diagrammatically in FIG. 1b), in the case of statistical rotation of the modules (see in Example No. 2).

We claim:

1. A circular-shaped static mixer module having outer dimensions defined by the circumference of a circle and two generally parallel transverse planes spaced apart from each other and perpendicular to the central axis of said circle, said module comprising a series of parallel v-shaped panels spanning the interior of said circle, between said parallel planes and being parallel to a diameter of said circle, each v-shaped panel defining two planar surfaces corresponding to the legs of a v, with adjacent panels being joined to each other to form a sawtooth pattern, each of said two planar surfaces having a single row of spaced-apart perforations substantially central to the surface area of said planar surfaces, the individual perforations each defining a flow path through said static mixer module, the flow paths defined by the perforations of one of said two planar surfaces having directions which directly or in extension impinge upon or cross over the flow paths defined by the perforations of the other of said two planar surfaces.

2. Static mixer module according to claim 1, wherein the perforations are defined by parallel walls and the parallel walls of the perforations form angles β defining ±30 degrees to the surfaces through which they pass.

3. Static mixer module according to claim 1, wherein the mixer module is divided into two or more regions or segments which have different spacings between the perforations, different cross-sectional openings of the perforations, or both.

4. Static mixer module according to claim 1, wherein the module has a front side and a rear side, with baffle surfaces on the front side.

5. The static mixer module of claim 4, wherein said baffle surfaces are flattenings or sheet-like elevations.

6. Static mixer module according to claim 1, wherein the module consists of alloyed steel, non-ferrous metal, plastic, glass, ceramic or a catalytically acting alloy.

7. Mixer arrangement, comprising at least two static mixer elements arranged one behind the other, wherein at least one mixer element is a static mixer module according to claim 1.

8. Mixer arrangement according to claim 7, wherein said at least two static mixer elements are arranged directly one behind the other.

9. Mixer arrangement according to claim 8, wherein said at least two static mixer elements are rotated about their central axis relative to each other.

10. Mixer arrangement according to claim 9, wherein said at least two static mixer elements are rotated relative to one another at an angle Y of 5 degrees to 175 degrees.

11. Mixer arrangement according to claim 7, comprising at least one static mixer module which is divided into two or more regions or segments each of which has different spacings between the perforations or different sizes of perforations, said module being followed directly by a static mixer element or a static mixer module adapted to nest with it.

12. Static mixer module according to claim 1, wherein the planar surfaces are at an angle a of 5 degrees to 85 degrees to one of said parallel transverse planes.

13. Static mixer module according to claim 1, wherein the planar surfaces are at an angle a smaller than 15 degrees to one of said parallel transverse planes and wherein the mixer module has a front side and rear side, and spacer contours on the front side, the rear side, or on both.

14. Static mixer module according to claim 1, wherein the mixer module is divided into two or more regions or segments which have differently arranged planar surfaces, differently structured planar surfaces, or both.

15. The static mixer module of claim 1 further comprising an outer closed ring around the circumference thereof.

* * * * *